United States Patent [19]

Hori

[11] Patent Number: 5,386,240
[45] Date of Patent: Jan. 31, 1995

[54] ENCODER/DECODER OF INFORMATION UPON/FROM A VIDEO SIGNAL

[75] Inventor: Akihiro Hori, Tokyo, Japan

[73] Assignee: Nippon Television Network Corporation, Tokyo, Japan

[21] Appl. No.: 933,499

[22] Filed: Aug. 21, 1992

[30] Foreign Application Priority Data

| Sep. 6, 1991 | [JP] | Japan | 3-227414 |
| Oct. 18, 1991 | [JP] | Japan | 3-271091 |
| May 25, 1992 | [JP] | Japan | 4-132656 |
| Aug. 4, 1992 | [JP] | Japan | 4-207996 |

[51] Int. Cl.$^6$ .......................... H04N 7/08; H04N 7/16
[52] U.S. Cl. ................................ 348/473; 348/1; 348/907; 380/5; 380/17
[58] Field of Search ............... 358/142, 141, 185, 105, 358/84, 86; H04N 7/08, 7/16; 380/17, 20, 5; 360/60; 348/473–476, 486, 471, 461, 460, 465, 1, 488, 426, 427, 431, 432, 385, 386, 467, 699–702, 722, 907

[56] References Cited

U.S. PATENT DOCUMENTS

| 3,842,196 | 10/1974 | Loughlin | 358/142 |
| 3,941,919 | 3/1976 | Baker | 358/142 |
| 3,984,624 | 10/1976 | Waggener | 358/142 |
| 4,051,532 | 9/1977 | Hilbert et al. | 358/142 |
| 4,517,597 | 5/1985 | Glenn | 358/141 |
| 4,528,588 | 7/1985 | Löfberg | 380/5 |
| 4,647,974 | 3/1987 | Butler et al. | 358/185 |
| 5,061,998 | 10/1991 | Yasuki et al. | 358/142 |
| 5,177,597 | 1/1993 | Ogawa et al. | 358/141 |
| 5,200,822 | 4/1993 | Bronfin et al. | 358/142 |

OTHER PUBLICATIONS

P. King, "A Novel Television Add-On Data Communication System", *Journal of the Society of Motion Picture and Television Engineers,* vol. 83, No. 1, Jan. 1974, pp. 10–13.

D. Sauer, "Design and Performance of a CCD Comb Filter IC", *RCA Review,* vol. 41, No. 1, Mar. 1980, pp. 29–56.

Primary Examiner—James J. Groody
Assistant Examiner—Safet Metjahic
Attorney, Agent, or Firm—Dellett and Walters

[57] ABSTRACT

An encoder/decoder can insert and demodulate an information signal without affecting a video signal, the information signal being not analyzed, modified and deleted easily. The non-inverted and inverted information signals are inserted into two horizontal lines having a strong correlation in the same field or different fields separated by at least one field of the video signal. A difference of the inserted information signals is obtained by a combination of a delay circuit and a subtracter. Field difference signals Sx and Sy are applied to a band pass filter and are generated by a PSK generation circuit. Generated output signals Qx and Qy are converted into unit information by a majority decision logic circuit and are stored in a memory. A unit information group consisting of a predetermined number of stored bits is used to generate the meaningful information. The inserted information signal has a low level and is inserted in the video period and the unit information is generated by the field difference. Thus, the information signal cannot be analyzed, modified and deleted easily.

26 Claims, 14 Drawing Sheets

ENCODER/DECODER OF INFORMATION UPON/FROM A VIDEO SIGNAL

BACKGROUND OF THE INVENTION

The present invention relates to an encoder and a decoder for an information transmission system that operative to insert obtain an identification number or the like into from a video signal without affecting the video signal. The identification number is used to identify a video source produced in a broadcasting station. Moreover, the present invention relates to an encoder and the decoder for the informant on transmission system that can identify precisely where the information signal is to be inserted into the video signal even if the video signal is a moving image signal.

It is important to apply an identification number or a special information of producer to a video source. Thus, an original video source (broadcasting program or the like) produced by a broadcasting station or the like can be distinguished from another video source so that the producer can assert its copyrights.

It may be considered desirable to: insert character information, such as characters, marks or the like, as well as the identification information dispersively into the video signal; store the character information of such characters and marks in a receiver; and rearrange characters, marks or the like. Thus, the characters, marks or the like can be used as useful information.

In order to add the identification information such as video source to the video signal or insert the character information dispersively into the video signal, these information signals may be inserted into a vertical blanking interval of the video signal. Moreover, the information signal may be superimposed outside of an effective screen area of the video signal.

It is desirable that the superimposed information signal does not adversely affect the video signal and that it cannot be easily modified.

When the information signal is inserted into the vertical blanking interval of the video signal, it is relatively easy to scan the blanking interval and analyze which kind of information is inserted or which line is used to insert the information. Thus, it may be important to encode the information to prevent it from being analyzed. If a third party can analyze which horizontal line is used to insert the information signal, there may be a possibility of exchanging the inserted information with new information.

Assuming the information signal is inserted into a portion of the video signal representative of a region outside of the effective screen area, an image of the information signal inserted into the video signal may appear on the screen regardless of the contents of the image. This information appearance depends on the definition of the effective screen area.

If the information signal is inserted into a portion of the video signal representative of a region inside of the effective screen area, there may be a large problem that the information signal interferes with the original image. In other words, when the information signal is inserted strongly, it may be easy to detect it but the interference with the original image may become noticeable. When the information signal is inserted faintly, the interference may be improved but it is difficult to detect the information signal.

What is desired is an encoder/decoder for an information signal that overcomes the aforementioned disadvantages. The encoder/decoder should keep the information secret, and the contents of the information should be difficult to be modified. The encoder/decoder should maintain the information when using a recording apparatus, such as a VTR. In addition, the encoder/decoder should be simple in construction.

SUMMARY OF THE INVENTION

According to an encoder of the present invention, a special information signal is inserted into a video signal except the blanking period thereof, the special information signal differing from image producing information, in order to resolve the aforementioned disadvantages. The information signal is inserted into a field of the video signal, a part between two adjacent fields, or both of them.

A decoder of the present invention separates and extracts the special information signal that differs from the image producing information as inserted into the video signal except the blanking interval. The decoder generates the special information in accordance with the extracted special information signal.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like element.

DRAWINGS

DESCRIPTION OF THE INVENTION

Figure 3:
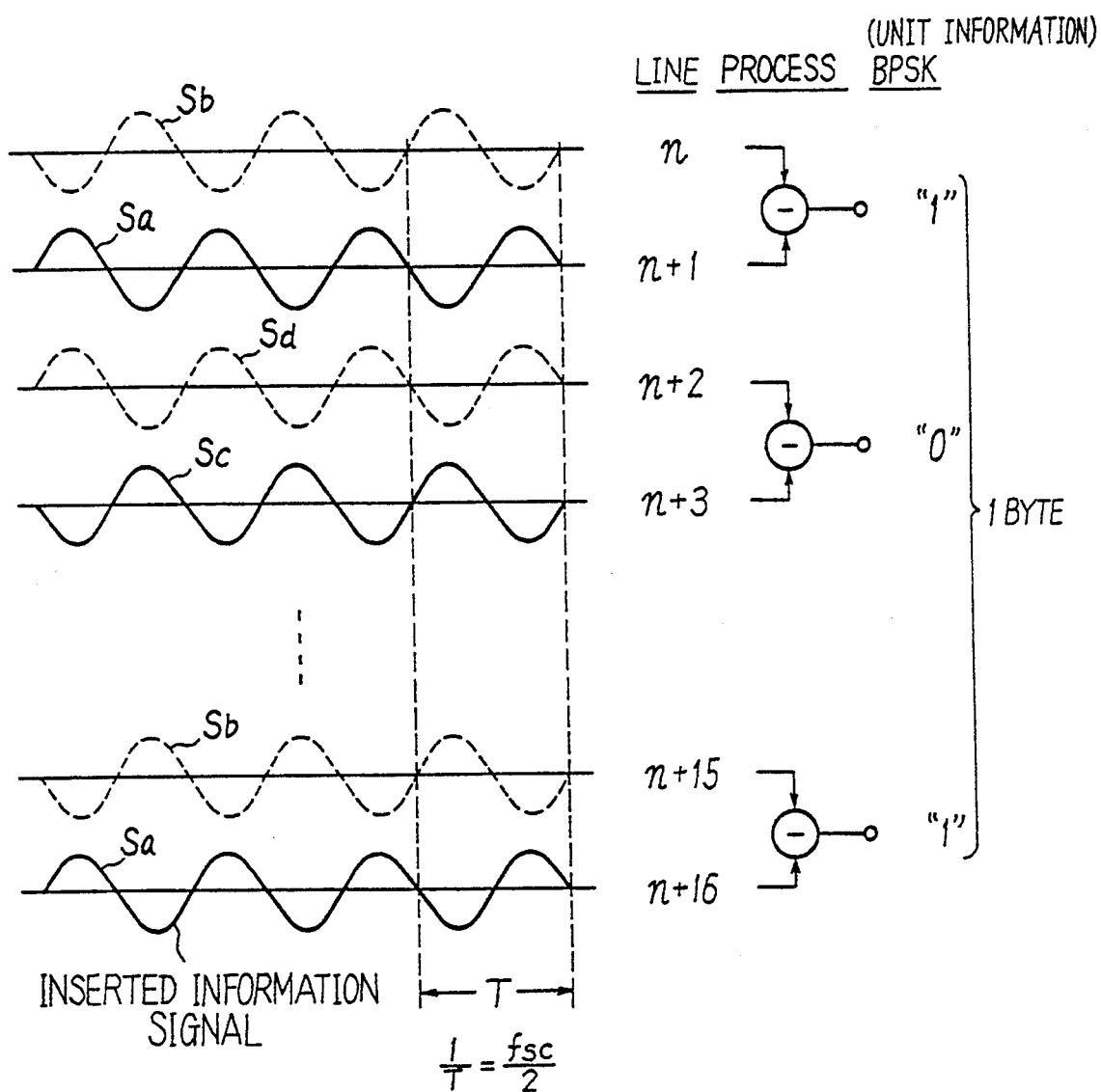
FIG. 3 shows how to insert and restore an information signal.

Referring to FIG. 3, one example of a principle information signal process according to the present invention will be discussed in which this example is applied to the NTSC system.

In an encoder process example shown in FIG. 3, an information signal Sa having a frequency of fsc/2 (fsc: subcarrier frequency) and an illustrated polarity (positive polarity) is inserted into a line n+1 of a field m of a video signal. In this instance, if the information signal is an analog signal, it is a predetermined frequency sine wave signal.

The inverted polarity information signal Sb is inserted into a line n of the next field (m+1) that corresponds to a line just above the line (n+1) of the prior field m. The phase difference between the signals Sa and Sb is one hundred eighty degrees.

The decoding process obtains a line difference signal Sx (=Sa-Sb) that is a difference between the information signal Sa inserted into the line (n+1) of the field m and the information signal Sb inserted into the upper line n of the prior field m. The line difference between different fields is referred to as a field difference and the signal Sx of this line difference is referred to as a field difference signal hereinafter.

By determining the field difference, only the first phase field difference signal Sx is obtained as shown in FIG. 4A. This field difference signal Sx is processed in a PSK (Phase Shift Keying) synchronized detection process and a low pass filtering process and thereby an output signal Qx is produced (FIG. 4B). A logic "1" is assigned to the output signal Qx having a positive polarity.

As being discussed, the information signal Sb is inserted into the line of the next field just above the line for the signal Sa. A reason of this is that the phase of the subcarrier on the line n is the same as that of the subcarrier on a line after 262 lines or 262H (H: horizontal scanning period) from the line n. Thus, when obtaining a difference between the information signals Sa and Sb, the subcarrier may be canceled and an effect of the subcarrier may be reduced.

In the encoding process example shown in FIG. 3, the information signal Sc having fsc/2 and the inverted polarity is inserted into the line n+3 of the field m where the video signal is present. The non-inverted information signal Sd is inserted into the line n+2 of the next field m+1 that corresponds to one just above the line n+3.

The decoding process generates a field difference signal Sy (=Sc-Sd) that is a difference between the information signal Sc inserted into the line n+3 and the information signal Sd inserted into the line n+2. When the field difference is obtained, only inverted field difference signal Sy is produced as shown in FIG. 4C. An output signal QY is produced by PSK synchronized detection and low pass filtering the signal Sy as shown in FIG. 4D. When the output signal Qy is negative, the logic "0" is assigned.

The information signal is inserted into each horizontal line where the video signal as the image information is present. The original information is restored by calculating the information signal. Thus, it is not easy to analyze the information signal and it is difficult to modify it.

Figure 1:
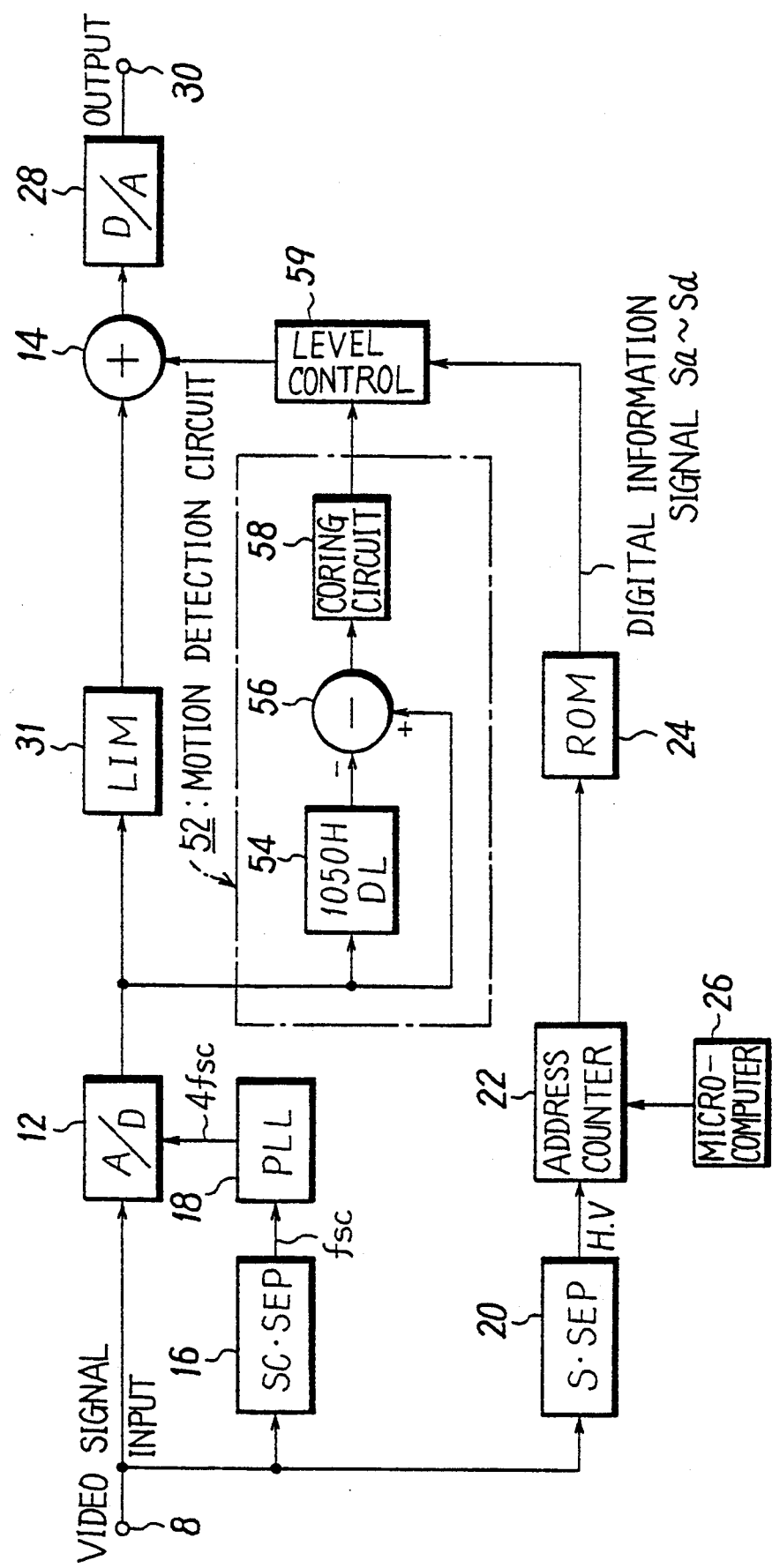
FIG. 1 shows a block diagram of one embodiment of an encoder for a video signal processing system according to the present invention.

As shown in FIG. 1, the level control circuit 59 is controlled in accordance with an output from a motion detection circuit 52 such that the insertion level of the information signal for the moving image is larger than that of the still image. In the moving image, even if the insertion signal level is strong, the visible interference with the original image is relatively small. It is desired to make the insertion level of the information signal to be strong without interfering with the original image. Thus, is possible to make the insertion level to be strong with less visible interference by strengthening the insertion level in the moving image and weakening the insertion level in the still image.

One embodiment of the encoder/decoder for the information signal according to the present invention will be discussed by reference to the attached drawings wherein the information regarding the image source is inserted.

The subject invention will be summarized first to understand the invention easily. The video source produced by a broadcasting station may be broadcast by its station or an affiliated station or it may be lent to a third party. In this instance, many kinds of information, such as a production date, producer name, reference number, index, address or the like, may be useful as index information of the video source. It is desirable that such information cannot to be analyzed or modified easily. Moreover, it is preferable that the index information can be detected easily and precisely regardless of the video image source.

The information signal should be inserted under the following conditions in order to satisfy the above.

(1) The information signal is inserted into the video period except the blanking period.

(2) The information signal is inserted into the video period without affecting the video signal.

(3) A frequency and an insertion level of the information signal should be determined to satisfy the above second condition.

(4) One unit of the information is restored by calculating the information signal inserted into two lines or two fields.

(5) Meaningful information is obtained by combining a plurality of units of information.

(6) The insertion level of the information signal is controlled such that the insertion level of the information signal at the moving image is higher than that of the still image.

When the information signal is inserted into the vertical blanking period, there is the risk that it may be easily found, analyzed and modified.

When the information signal is inserted into the video period, it is more difficult to recognize the information signal. Even if the information signal is recognized, it is difficult to read the complete contents because only one unit of the information can be decoded from the information signal of two lines. By adjusting the frequency, insertion level, phase (polarity) of the information signal to be inserted, the information signal does not adversely affect the video signal.

It is desired to strengthen the insertion level of the information signed in order to detect it easily. However, if the entire level is strengthened, then the information signal begins to interfere with the original image. In general, the interference with moving image is not as noticeable as interference with a still image. If the intensity of the information signal to be inserted is strengthened in the moving image and it is weakened in the still image, the insertion level can be adjusted in accordance with the level of interference tolerable with the original image.

Figure 4:
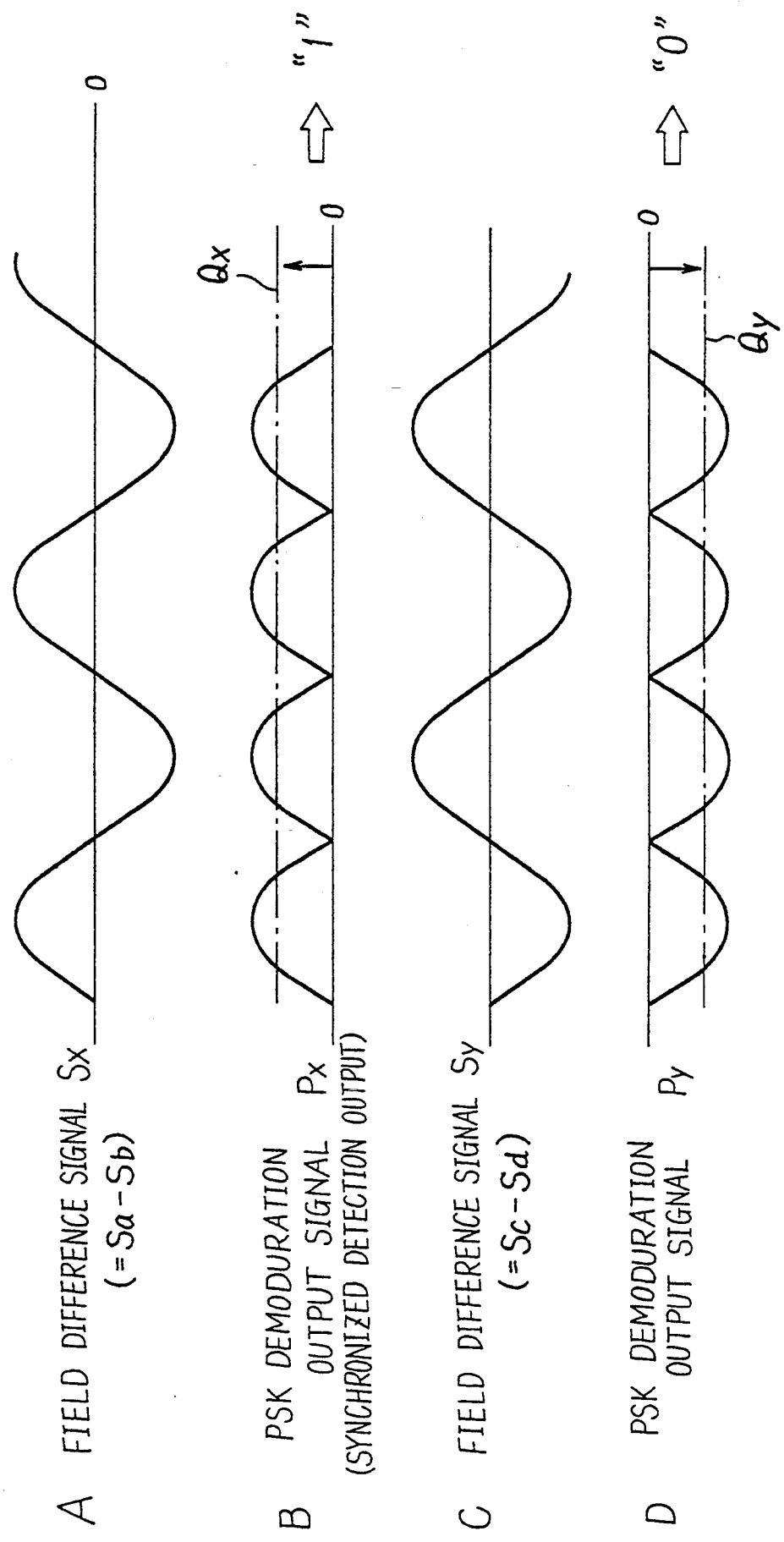
FIG. 4 shows a generation operation of the information signal.

The embodiment will be discussed with reference to FIGS. 3 and 4. FIG. 3 shows the encoding and decoding processes of the information signal.

The information signal Sa (e.g. analog or digital sine wave signal having a single frequency) having a frequency fsc/2 and phase (or polarity) as shown is inserted into the line n+1 of the field m where the video signal is present. In this instance, the polarity is positive (non-inverting) and zero phase is assumed for convenience.

The inverted information signal Sb (of $\pi$ phase) is inserted into the line n of the next field m+1 that is just above the line n+1 of the filed m. This information signal Sb is shifted from the signal Sa by one hundred eighty degrees.

The decoding process produces the field difference signal Sx (=Sa−Sb) which is a difference between the information signal Sa on the line n+1 and the information signal Sb on the line n.

In obtaining the field difference, only the non-inverting field difference signal Sx is produced as shown in FIG. 4A. This field difference signal Sx is PSK demodulated and low pass filtered to generate the output signal Qx (FIG. 4B). When the output signal Qx is positive, the logic "1" is assigned.

Figure 5:
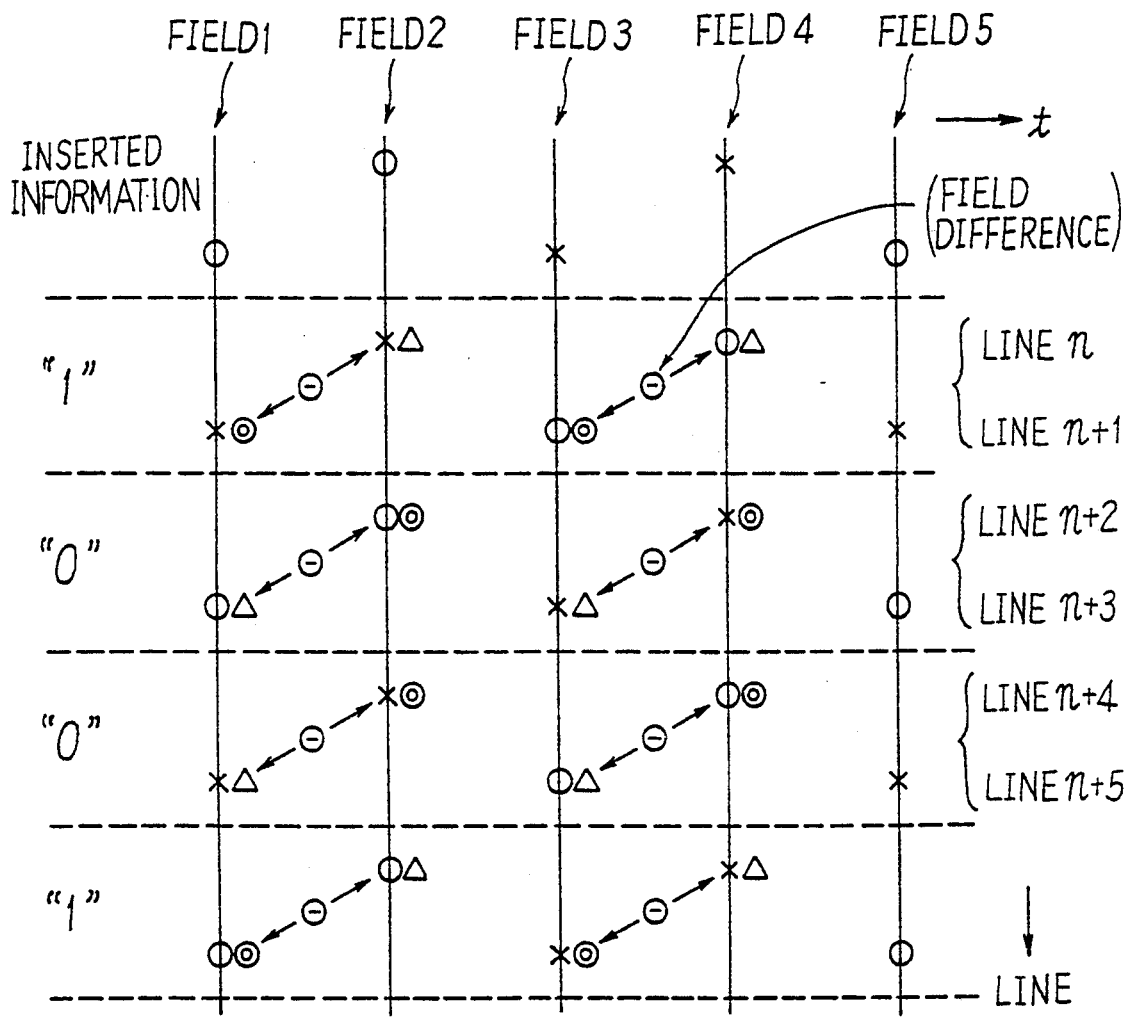
FIG. 5 shows a relationship between a subcarrier phase and the information signal phase.

The reason why the information signal Sb is inserted into the line n just above line n+1 of the next field is that the phase of the subcarrier for the line n+1 of the next field is the same as that of the subcarrier for the line n just above line n+1 (0-phase) or $\pi$-phase) for the adjacent fields as shown in FIG. 5. Thus, the non-inverted and inverted information signals are inserted into two lines on which the same phase subcarrier is superimposed. Namely, in the present invention, the information signals inserted into two horizontal lines having a strong line correlation during the video signal period in the same field have an inverted phase relation to each other.

Also, the information signals, inserted into two horizontal lines having a strong line correlation during the video signal period and positioned at different fields separated by at least one field of the video signal, have an inverted phase relation to each other. Therefore, since the above-mentioned subcarrier is canceled when obtaining the difference therebetween, an identification sensitivity for the information signal is improved. FIG. 5 shows the subcarrier phase relationship as well as the phase relationship of the information signal.

In the encoding process shown in FIG. 3, the information signal Sc having fsc/2 and the inverted polarity is inserted into the line n+3 of the field m where the video signal is present. The non-inverting information signal Sd is inserted into the line n+2 of the next field m+1 that is just above the line n+3 of the prior field.

The decoding process produces the field difference signal Sy (=Sc−Sd) which is a difference between the information signal Sc on the line n+3 and the information signal Sd on the line n+2. By obtaining the field difference therebetween, the non-inverting field difference signal Sy is generated as shown in FIG. 4C. The output signal Qy (FIG. 4D) is produced by demodulating and low pass filtering the field difference signal Sy. The logic "0" is assigned to the negative output signal Qy.

The meaningful information is inserted into the lines of the video period in accordance with such a rule. If, for example, one meaningful information is applied where one unit consists of eight bits, eight lines per field are necessary to insert one information.

Assuming that effective scanning lines per field consist of 241 lines, 241/8 unit information can be inserted into one screen (frame). If the above discussed information is used as the index information for the video source, the index information is assigned every 8-bit unit.

The frequency of the information signal is best set to be an integer submultiple of the subcarrier frequency (i.e., 1/[integer number] of the subcarrier frequency, such as fsc/2, fsc/3, fsc/4 or the like. By using such subharmonics, the integration value of the subcarrier as inserted into the video signal over a given line will be zero when integrated over the duration of the video line. By preserving this relationship the subcarrier component does not adversely affect the results of the PSK demodulation.

When the video signal is converted to a digital form by a ten-bit analog-to-digital (A/D) converter, the insertion level of the information signal is provided a range between 1/1024 and 3/1024 levels of the video signal. Such an insertion does not affect the video signal substantially. In addition, it is relatively easy to detect the information signal with this range. Of course, it is possible to detect the information signal having an insertion level less than this range, but a longer time would be necessary to detect it.

The information signal can be inserted in an analog process. However, an example of a digital process will be discussed. After the video signal is converted into the ten-bit digital signal, the digitized information signal (consisting of ten bits) is superimposed on this digitized video signal. The information signal may be modified with a phase modulation system, such as two-phase PSK (BPSK: Binary Phase Shift Keying).

Figure 6:
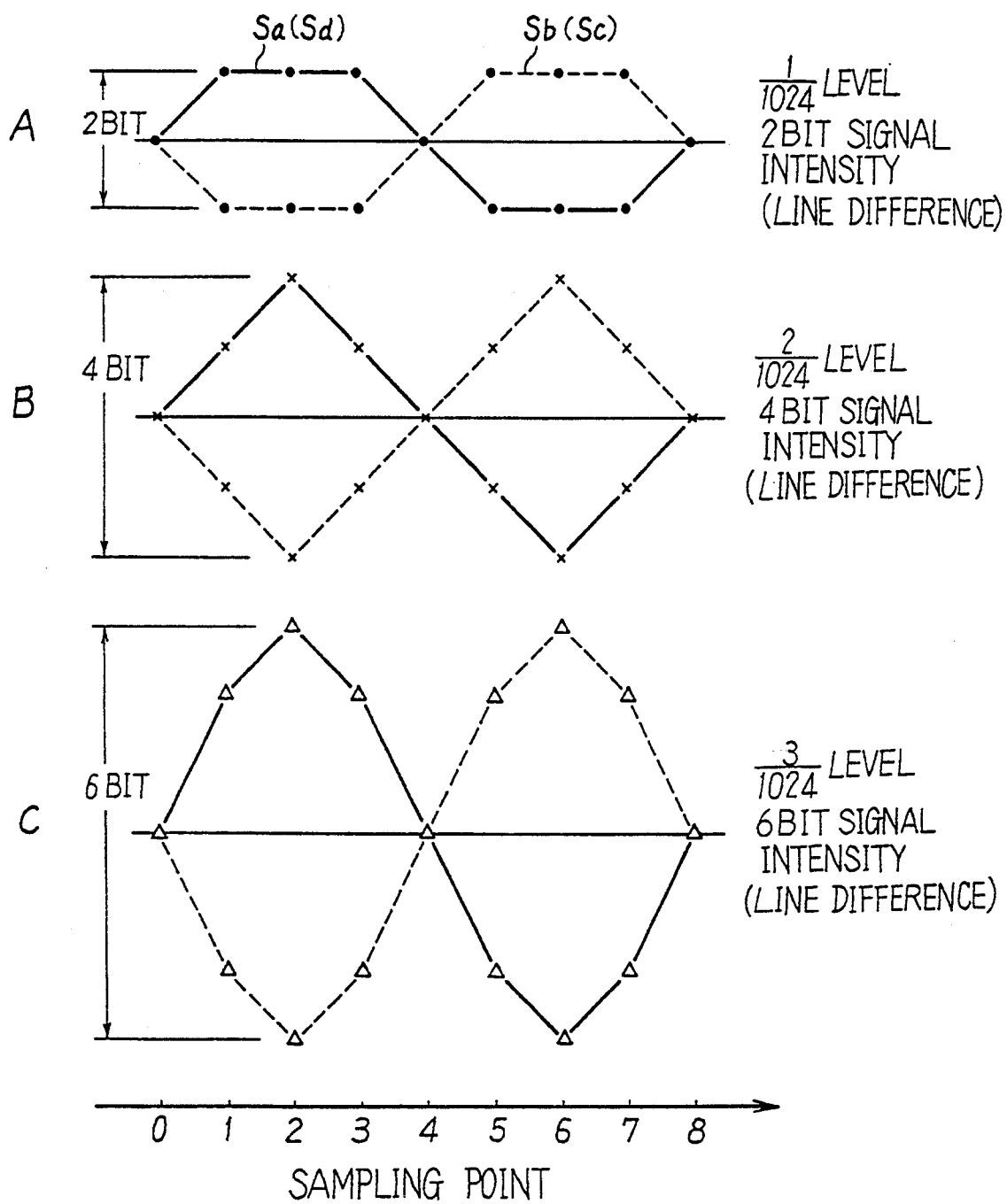
FIG. 6 shows insertion levels of the information signal consisting of ten bits.

FIG. 6 shows one example of the insertion level when the digital information signal is inserted into the video signal. In this drawing, FIG. 6A shows an insertion level relation when using the information signal having an amplitude of 2 LSB bits (peak-to-peak value) and FIG. 6B shows an example of the insertion level when using the information signal of 4 LSB bit amplitude. FIG. 6C shows the insertion level relationship when the information signal amplitude is 6 LSB bits.

Figure 7:
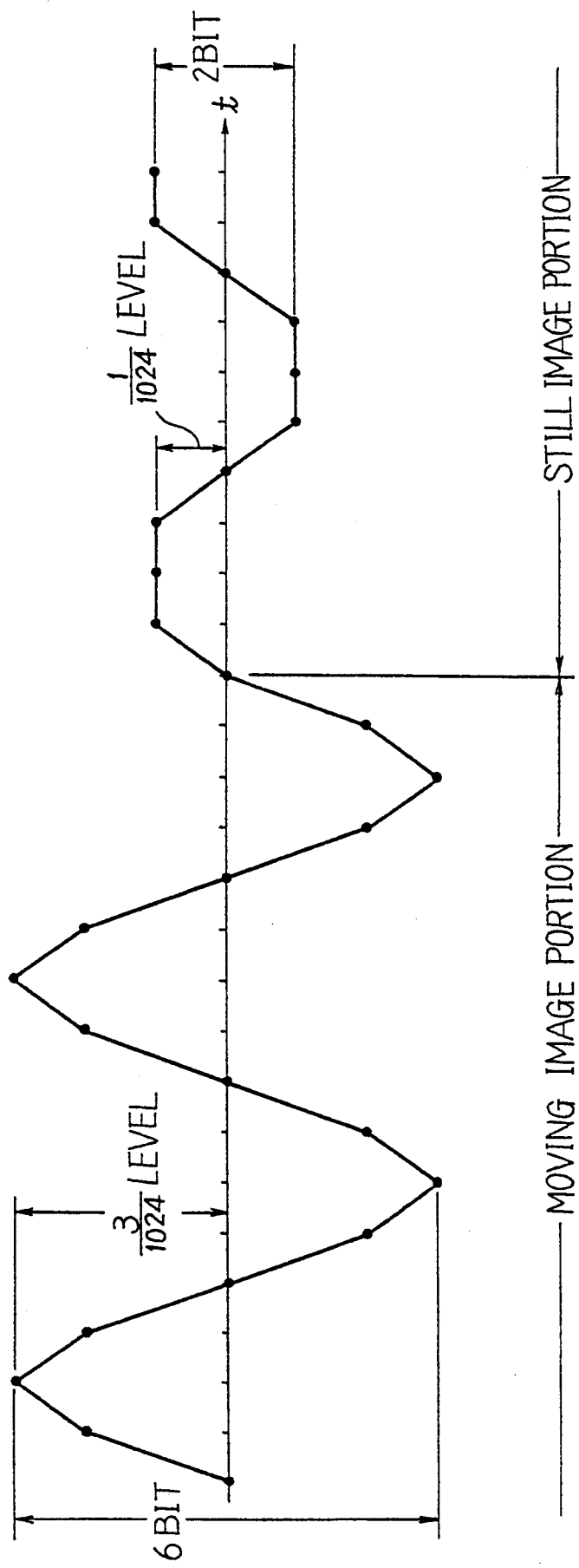
FIG. 7 shows a waveform of one example explaining an insertion level of the information signal.

According to the present invention, the insertion level of the information signal is different in dependence on the video signal, i.e., the moving image or the still image. In an actual embodiment, the information signal accompanying a moving image is made stronger than for a still image as shown in FIG. 7. In this example, the insertion level for the moving image is selected as shown in FIG. 6C and that for the still image is selected as shown in FIG. 6A, so as to assure easy detection of the information signal. However, if entire level is intensified, then there may be a problem of the information signal interfering with the or original image. In general, the interference with the original image is less apparent in a moving image than with a still image even though a higher intensity insertion signal accompanies the moving image. Therefore, the insertion level of the information signal can be intensified for a moving image portion and reduced for a still image portion with little apparent interference with the original image.

When the information signal is phase modulated into the video signal, the information signal is subsequently retrieved from the modulated video signal using PSK demodulation. This modulation and demolition is described in detail hereinafter.

FIG. 1 shows one embodiment of an encoder. A terminal 8 receives the video signal produced by the broadcasting station. For a particular embodiment, an A/D converter 12 converts the video signal into a 10-bit digital signal. This digital signal is applied to an adder 14. The video signal at the terminal 8 is further applied to a subcarrier separation circuit (SC SEP) 16 to extract the subcarrier from the video signal. The extracted subcarrier is applied to a phase lock loop (PLL) circuit 18 to generate a sampling signal. In this embodiment, the subcarrier frequency is fsc and the sampling signal frequency is four times the subcarrier, i.e., 4fsc. The video signal is digitized in response to this sampling signal.

The video signal is further applied to a sync separation (S SEP) circuit 20 that applies the separated horizontal and vertical sync signals to address counter 22. This address counter 22 produces an address for determining the insertion timing by which the information signal is inserted into the video signal as directed under the control of a microcomputer 26. The address provided is used to address memory means (read only memory ROM in this embodiment) 24 which stores the information signal.

ROM 24 stores digital data for each sampling point of the sine wave information signals Sa-Sd to be inserted into the video signal as shown in FIG. 6. In this example, the information signal having the levels shown in FIG. 6C is stored.

The information signal of the digital values as shown in FIG. 6 is used repeatedly every cycle and is summed to or superimposed with the video signal. The level at which the information signal is inserted into the video signal is determined by the output from the motion detection circuit 52.

The motion detection circuit 52 includes a delay circuit 54. In this embodiment, a subtracter 56 subtracts the two-frame or 1050-line delayed video signal from the original video signal to obtain a frame difference signal (or difference signal between two frames, i.e., two-frame difference signal in actual). A two-frame difference signal is obtained instead of a one-frame difference signal in order that the moving image component is obtained without the color subcarrier component. The phase of the color subcarrier component alternates with each field. By taking the difference between every other field, for which the color subcarrier phase begins at the same phase for each, the subcarrier components canceling with one another so as to leave merely the difference signal (i.e., moving image) component.

When a video signal represents the still image, the frame difference signal is zero. When the video signal represents a moving image, the frame difference signal has a predetermined level. A coring circuit 58 receives the frame difference signal, whose level is determined by the image contents, and detects when the frame difference signal has a level larger than a predetermined threshold level for producing the motion detection signal. The frame difference signal having a very low level based on noise is not recognized as a moving image in order to avoid an error detection.

The motion detection signal is applied to the level control circuit 59 so as to control it such that the insertion level of the information signal is small for a still image rather than the moving image as shown in FIG. 7. When the information signal is in the digital format, the low level information signal is obtained per the dynamic range ratio (i.e., least significant bit) as shown in FIG. 7.

When the ROM 24 stores the information signal having the minimum level shown in FIG. 6A, the minimum level becomes the predetermined level shown when the video signal represents the moving image. This control is different from the above discussed control operation. Of course, in the information signal having the level shown in FIG. 6A, the insertion level of the information signal at the still image may be controlled to be smaller than that of the moving image as shown in FIG. 7. Moreover, it is possible to determine whether the video signal represents the still image or the moving image with multi-stage value (more than two stages) rather than two-level (binary) value and to control the insertion level with multi-level in accordance with the motion value.

A limiter (LIM) 31 is provided at a stage prior adder 14 in order to limit the video signal within a predetermined amplitude level. Thus, the signal level of the video signal may does not become saturated with addition of the information signal. A digital-to-analog (D/A) converter 28 converts the video signal, to which the information signal is added, into an analog signal that is the final video output signal.

The above discussed construction of the motion detection circuit 52 is only one example, and the delay circuit 54 may be a delay circuit for delaying the luminance component by one frame.

Figure 2:
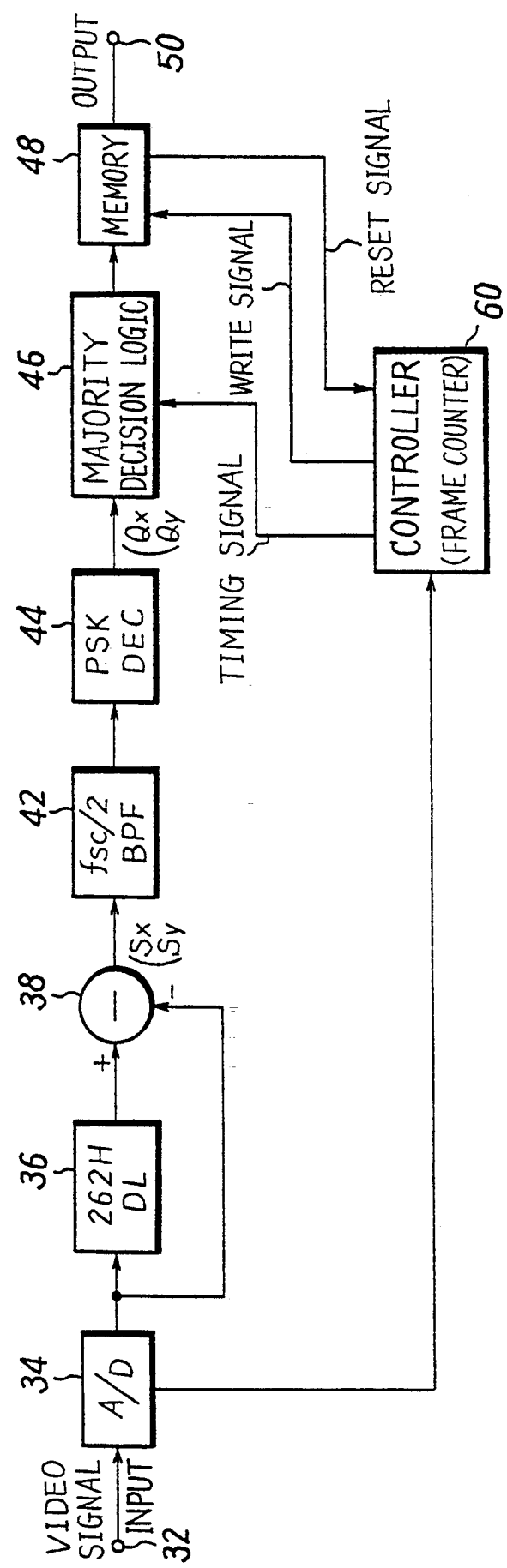
FIG. 2 shows a block diagram of one embodiment of a decoder for the information signal transmission system according to the present invention.

FIG. 2 shows a decoder for the video signal processing system according to the present invention.

The video signal at a terminal 32 is converted into a digital signal by an A/D converter 34. Since a timing signal is provided for the A/D conversion in the same manner as the case of FIG. 1, no description will be made. After the A/D conversion, the digitized video signal is applied to a delay (262H DL) circuit 36 that delays the signal by 261H (H: horizontal scanning period). This delayed signal and the non-delayed signal or the video signal of the current field are applied to a subtracter 38 that generates the field difference signals Sx and Sy. Because the color components of the respective two lines are the same, the subtracting process provides the field difference signals Sx and Sy. With the subcarrier canceled.

The field difference signals Sx and Sy are applied to a band pass filter (fsc/2 BPF) 42 whose pass band frequency is fsc/2. The band pass filter 42 passes only the information signal, i.e., the field difference signals Sx and Sy. Since the insertion level is higher for a dynamic image than a static image, the detection of the information signal with the dynamic image is easier than with the static image. Next, the information signal is applied to PSK detector (demodulator) circuit (PSK DEC) 44.

The PSK demodulator circuit 44 executes PSK demodulation (PSK per synchronous detection) and filtering process per a low pass filter. For example, when the field difference signal Sx is PSK demodulated, the waveforms Px and Py of FIGS. 4B or 4D respectively are obtained in accordance to the phase relationship of the demodulator's input signals. By filtering the signal Px, the demodulated output (positive DC output) Qx is obtained as shown in FIG. 4B. For the field difference signal Sy shown in FIG. 4C, the PSK demodulator circuit 44 generates the PSK demodulated output signal Qy and the filtered demodulated output (negative DC output) Qy as shown in FIG. 4D. The number of the demodulated output bits Qx and Qy per frame corresponds to a half of the effective scanning lines per one frame, i.e., 482/2=241 bits.

If an analog circuit is used for the PSK demodulation, a time constant of the low pass filter in the PSK demodulation circuit 44 is set to the one line integration value, i.e., a roll-off filter is set to a half of the horizontal scanning frequency 15.75 KHz. Then, the integration value for one line is obtained and this value becomes the decoded output of the information signal. When the PSK demodulation is done in the digital manner, the output signal from the PSK demodulator or PSK generator circuit 44 is processed with a majority decision logic and the processed signal serves as the final decoded output.

For this end, a majority decision logic circuit 46 is provided as shown in FIG. 2. The majority decision logic operation is done by counting a PSK demodulated identification judgment value of each period and outputting the logic output "1" or "0" in accordance with the predominant state. In this embodiment, the majority decision logic is done in not only one line but also the same line of another frame in order to determine the final value. This operation is equivalent to a low pass filtering operation for the same length in the analog circuit. The longest value of the frame accumulation length for the majority decision logic is 300 frames (10 seconds) in this embodiment. This value can be desirably changed in accordance with the detection accuracy of the information signal. If the detection error is large, a frame number of the majority decision process is increased to improve the detection accuracy.

The output unit information processed by the majority decision logic is applied to a memory 48 in sequence and is read out at an output terminal 50.

For the above operation, a control circuit 60 applies a timing signal to the majority decision logic circuit 46 such that this circuit 46 supplies the majority decision logic output signal to the memory 48 when arriving at a predetermined number of frames (e.g. 300 frames). The memory 48 receives a write signal from the control circuit 60 to store the majority logic output and applies a reset signal to the control circuit 60.

The control circuit 60 operates in synchronism with the video signal applied at the terminal 32. The capacity of the memory 48 is determined to store the capacity (241 bits) of the information inserted into one frame. This capacity may be any value.

When the encoder and the decoder for the information signal are constructed as discussed hereinbefore, the special information can be inserted into the original video signal without affecting the original video signal. Since the information signal consists of unit information each determined by the field difference signal and it is inserted into the entire area of the one screen, the inserted information cannot be analyzed, modified and erased easily.

Modified examples of the subject invention are as follows:

(1) The information signal to be inserted into the video signal may be not only the index information of the video source but also any desired digital signal. The kind of the information signal to be inserted is not limited.

(2) In the above discussed embodiment, the information signal is inserted into two lines of the adjacent fields where the subcarrier has the same phase. The information signal may be inserted into two lines of the same field. In this instance, the information signal should be inserted into two lines having a strong correlation in the same field, and the unit information may be restored by obtaining the line difference.

(3) The information signal may be inserted into the lines of two fields separated by at least one field where the phase of the subcarrier for each line is substantially the same as the other. Thus, the unit information can be restored by obtaining the frame difference signal therebetween.

(4) In the described embodiment, the subcarrier of the lines into which the information signal is inserted has the same phase. However, the information signal may be inserted into lines where the subcarrier phase is inverted with respect to one other. In this case, the decoder should include a circuit for filtering the subcarrier.

(5) The frequency of the information signal is not limited to fsc/2, but it is better to be 1/(even number) of the subcarrier frequency (e.g., fsc/4). Any desired frequency within the video band may be used.

(6) The insertion level of the information signal is determined such that it does not affect the information accompanying the video signal. Thus, this insertion level is not limited if it is within such a range.

(7) The two-phase PSK modulation manner is adopted as the information signal modulation manner in the above discussed embodiment. However, a four-phase PSK modulation manner (QPSK) may be adopted. In addition, the modulation may be a frequency modulation manner or an amplitude modulation manner rather than the phase modulation manner.

(8) In the preferred embodiment, the information signal is inserted into the entire video period. Alternatively, the information signal may be inserted into a predetermined video period (predetermined number of lines or predetermined number of frames).

(9) The information signal may be inserted into a part of a period of one line instead of the entire period of one line.

(10) The number of information groups to be inserted into the video signal is not limited.

(11) The number of frames to which the majority decision logic is applied is not limited. However, more time is necessary to restore the information when a greater number of frames are used for encoding the information. Thus it is important to select the number of the frames in accordance with importance of the information to be inserted.

(12) The subject video signal is not limited to the broadcasting video signal.

(13) The insertion level of the information signal shown in FIG. 7 is only one example, and any desired level setting and level control method may be possible if they do not affect the video signal.

(14) In the preferred embodiment, the information signal to be inserted into the video signal is of predominantly a single frequency. However, the information signal may be of a spread spectrum type and the spread spectrum information signal superimposed on the video signal.

An embodiment using the spread spectrum manner will be described by reference to FIG. 8. In this embodiment, an insertion waveform of the information signal is a square wave to simplify the explanation. The information signal has the single frequency fsc/2 in the above discussed embodiment, but the frequency of the information signal is scrambled to diffuse the frequency in this embodiment. The PSK is a half of the period 1H. The scrambler uses an M-series code, but it may use a gold code instead of the M-series code.

In the above discussed embodiment, the different phase signals are inserted into the line n+1 and the line n of the next field just above line n+1. This condition can be illustrated by the square wave signal as shown by waveforms A and B of FIG. 8. By scrambling with the M-series code shown in FIG. 8C, scramble signals D and E shown in FIG. 8 are produced. This scramble process scrambles the horizontal direction frequency. These scramble signals are inserted into the lines n+1 and n as discussed hereinbefore.

Figure 8:
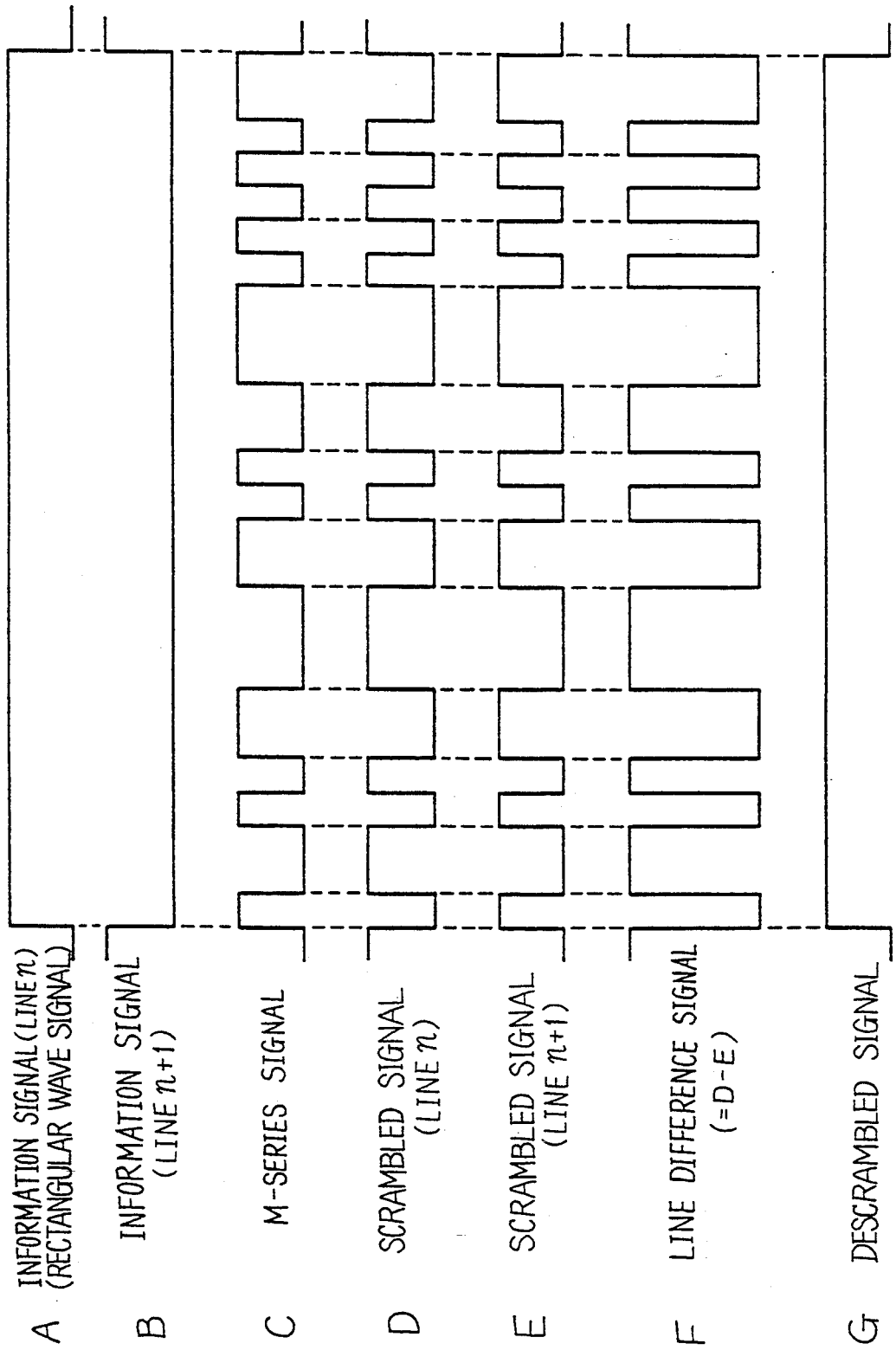
FIG. 8 shows waveforms for explaining a spread spectrum system.

When the decoder calculates the difference signal of the scramble signal, a line difference signal F shown in FIG. 8 may be produced. This signal F is descrambled with the M-series code to produce a descramble signal G. The information can be demodulated by PSK demodulating the descramble signal.

An actual circuit for the encoder may be the same as the one of FIG. 1 wherein the insertion pattern in the ROM 24 is of the scramble type.

Figure 9:
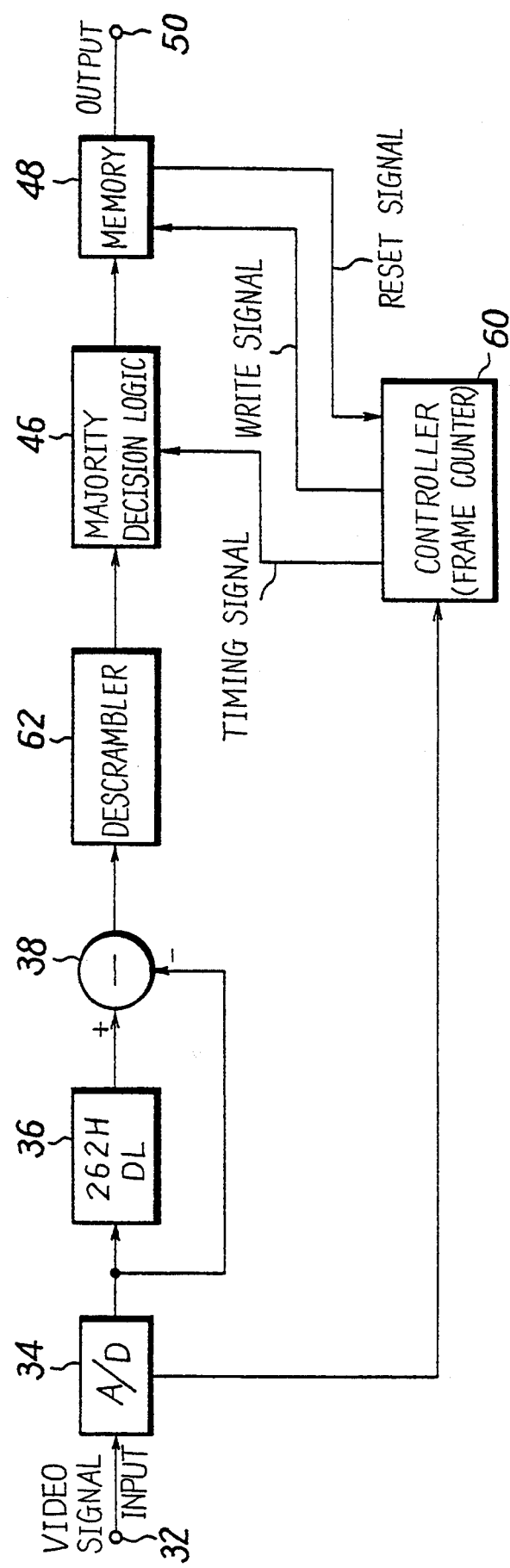
FIG. 9 shows a block diagram of one embodiment of the decoder using the spread spectrum system.

FIG. 9 shows another embodiment of the decoder according to the present invention. This circuit is the same as the one shown in FIG. 2 except that a difference circuit 38 consists of a summing circuit or an adder that executes the line difference operation and a descrambler 62 executes the descramble process.

Since this spread spectrum system diffuses the frequency, it is further difficult to delete the information signal.

The modifications or applications of the invention were described at the paragraphs (1) through (14) hereinbefore, but this invention may be modified as follows:

The above described embodiments relate to the field difference type restore means that use the information signal inserted into the specified lines of the adjacent different fields and recover the information. The following embodiment can obtain the line difference signal for the information signal inserted into the lines in the same field as well as the adjacent different fields (field difference type).

The following description will discuss a two-line difference signal as the line difference signal and the spread spectrum type. This embodiment is a combination of the field difference type and the line difference type and will be discussed by reference to FIGS. 10 and 11.

Figure 10:
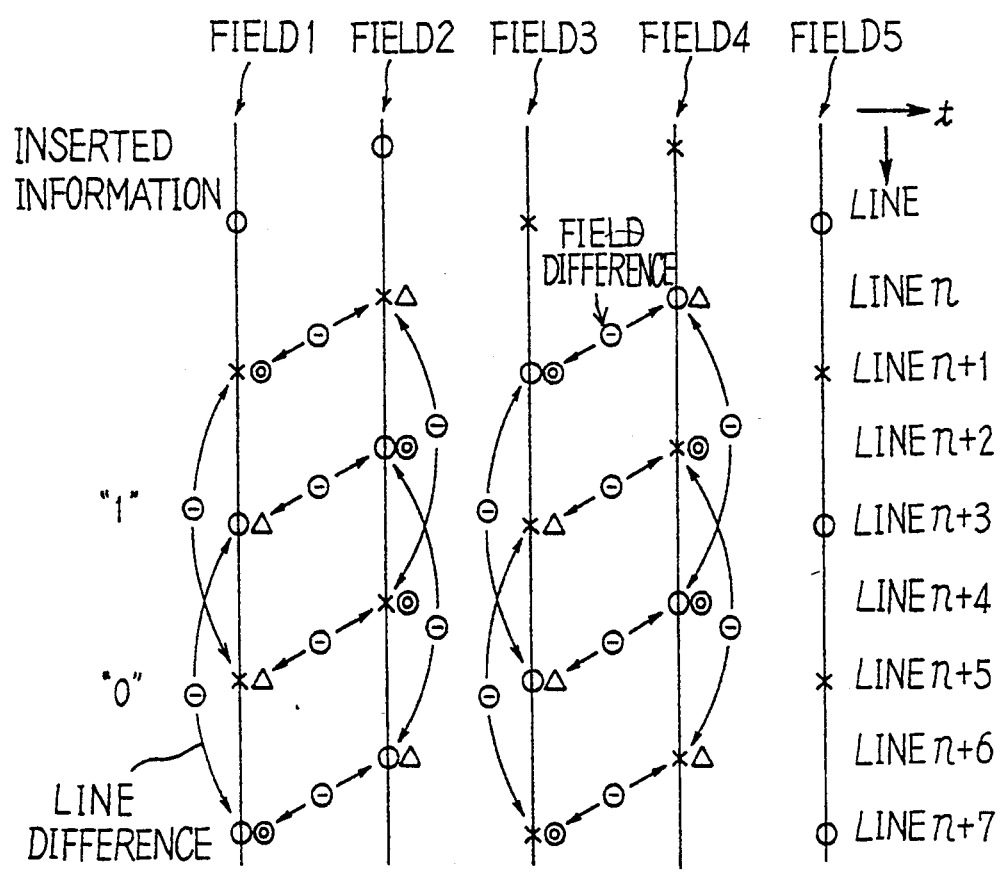
FIG. 10 shows a relationship between the subcarrier phase and the information signal phase in another embodiment according to the present invention.

In this embodiment, the non-inverted and inverted signals are inserted into the lines in the same field, the time difference between these lines corresponding to two lines as shown in FIG. 10. Thus, the superimposed signals or information signals inserted into the lines n+1 and n+5 have the non-inverted phase and the inverted phase respectively. Similarly, the information signals are inserted such that the phase relationship between the lines n+1 and n is the inverted phase relation, the phase relationship between the lines n and n+4 is the inverted phase relation, and the phase relationship between the lines n+5 and n+4 is the inverted phase relation.

Since the phase of the color subcarrier is in phase every two lines, the information signals are superimposed on the lines of the same field having the time difference therebetween corresponding to two lines as described hereinbefore. In this instance, it is easy to cancel the color subcarrier by obtaining the difference between these two lines. By subtracting two lines having the strong correlation to each other, the video signal is substantially canceled and only the information signal may remain.

Figure 11:
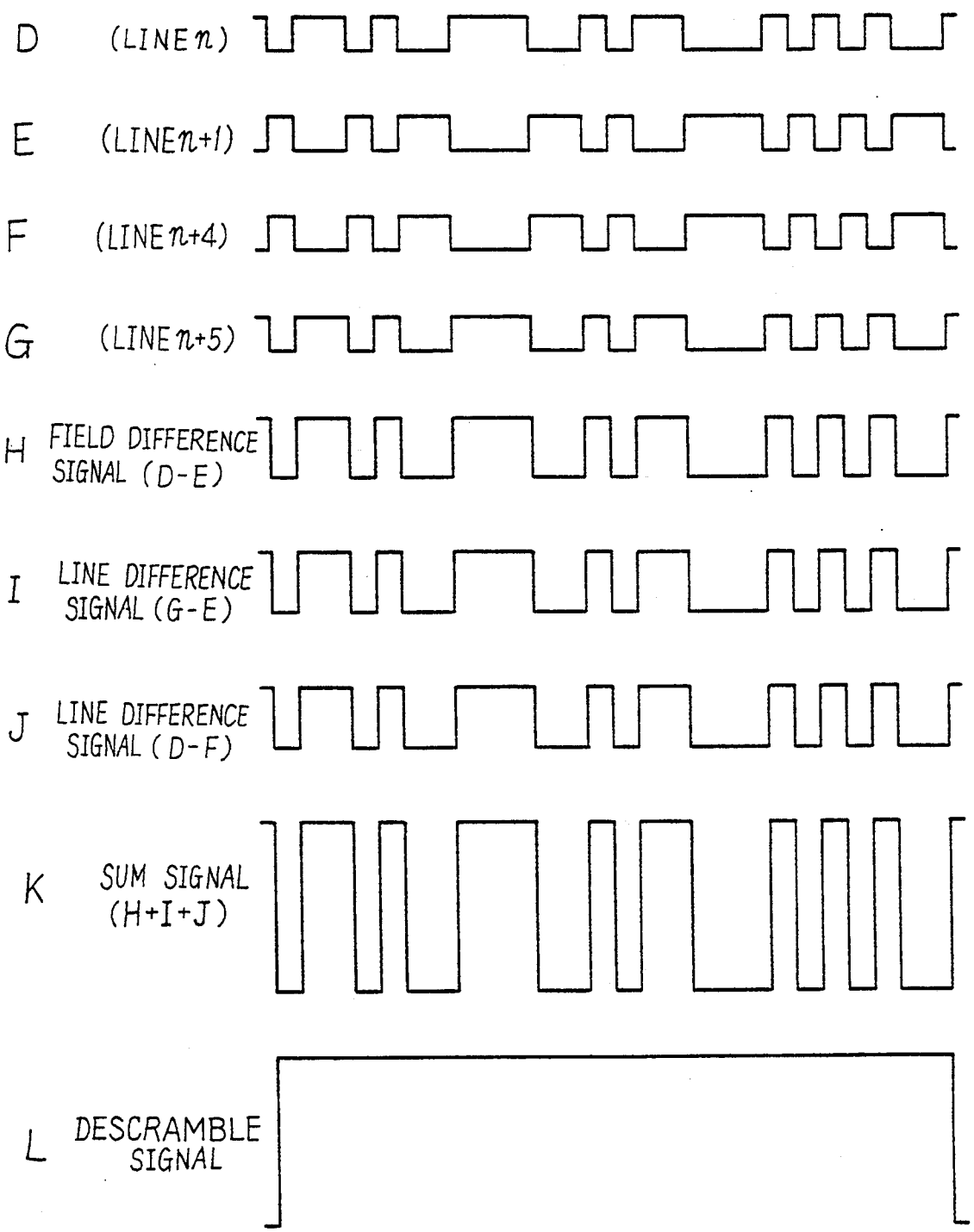
FIG. 11 shows waveforms of an operation example in the spread spectrum system.

In FIG. 11, waveforms A, B and C are deleted because they are the same as ones in FIG. 8. The waveform D in FIG. 8 is the same as a waveform D in FIG. 11. A waveform H in FIG. 11 is a typical adjacent field difference signal. Waveforms I and J of FIG. 11 are typical two-line difference signals in each field. These field difference signals are summed with the two-line difference signals to form a sum signal (K in this drawing) and then are descrambled to restore the information signal (L in this drawing).

This combination reduces the information capacity (or bit number) to be inserted into one frame to a half of FIG. 8. However, this embodiment detects certainly the information signal because the final inserted information is determined and restored by calculating four line difference signals.

As a result, even if the field difference signal is deleted for some reason, it is possible to restore the information because a remaining possibility of the information signal is high in the same field.

This embodiment inserts the inverted and non-inverted signals to each line. However, the same advantage can be accomplished by superimposing the signal on a single line and not superimposing on a line to be subtracted from the single line. For example, in FIG. 10, the information signals are inserted into the line n+1 and n+4 and are not inserted into the line n+5 and n in order to accomplish the same effect. In this instance, if the signal level superimposed on the lines n+1 and n+4 is not double, the level of the line difference signal may reduce to half.

This half side insertion system can be applied to the video signal processing system of the field difference type as shown in FIG. 1 and to the video signal processing system using both the line difference type and the field difference type.

Figure 12:
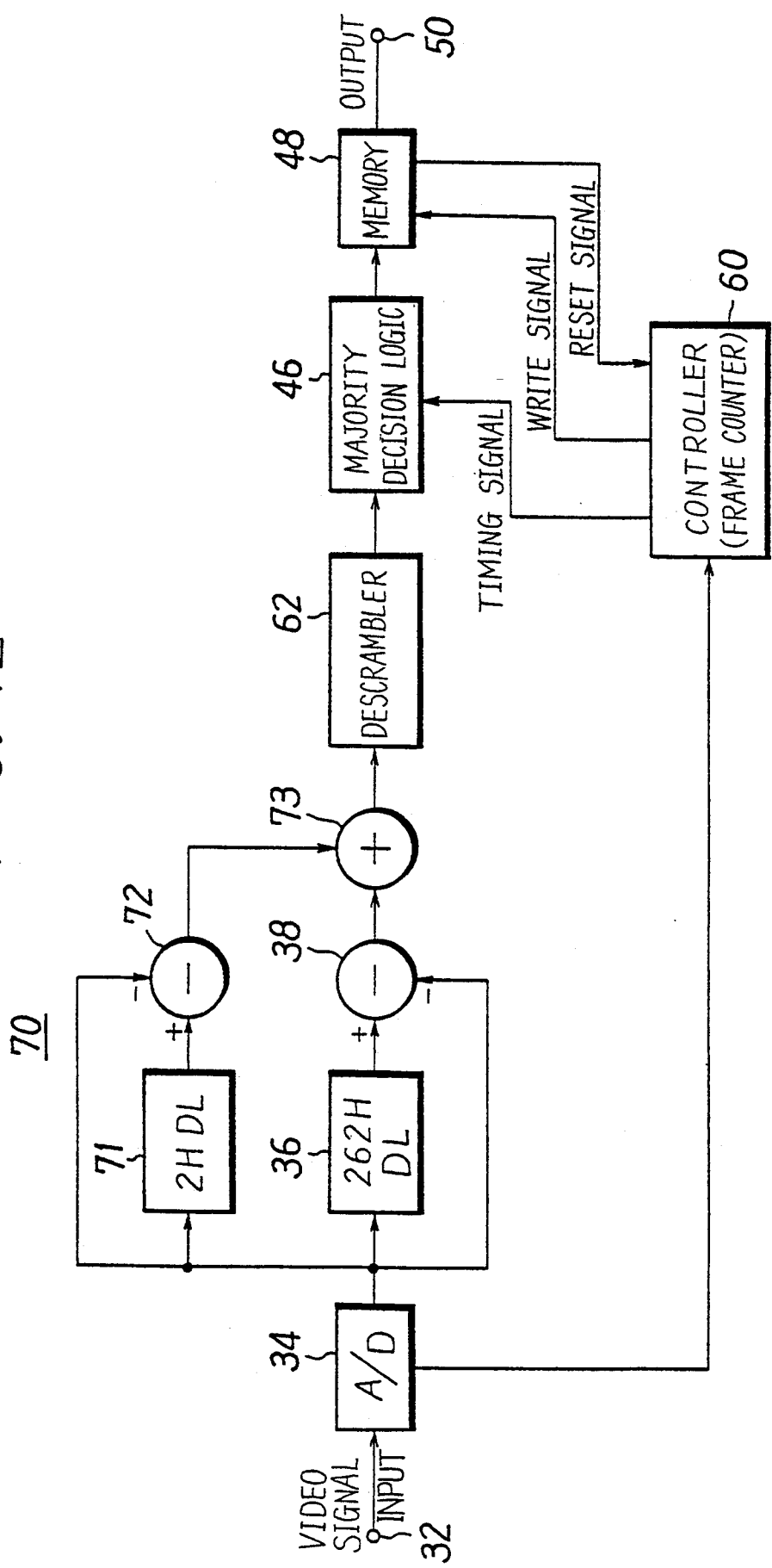
FIG. 12 shows a block diagram of one embodiment of the decoder in the spread spectrum system.

FIG. 12 shows a block diagram for accomplishing the operation of FIG. 11 wherein the same blocks as FIG. 9 will not be described and only the differences from FIG. 9 will be discussed. A circuit 70 forms the two-line difference signal for two lines of the same field, and a summing circuit or an adder 73 receives the field difference signal and the two-line difference signal. The two-line difference signal forming circuit 70 includes a delay circuit 71 for delaying an input by two horizontal lines and a subtracter 72.

The descrambler 62 receives the sum signal of the field difference signal from the subtracter 38 and the two-line difference signal from the subtracter 72 to apply them the descrambling process. Then, the majority decision logic circuit 46 restores the information signal.

Figure 13:
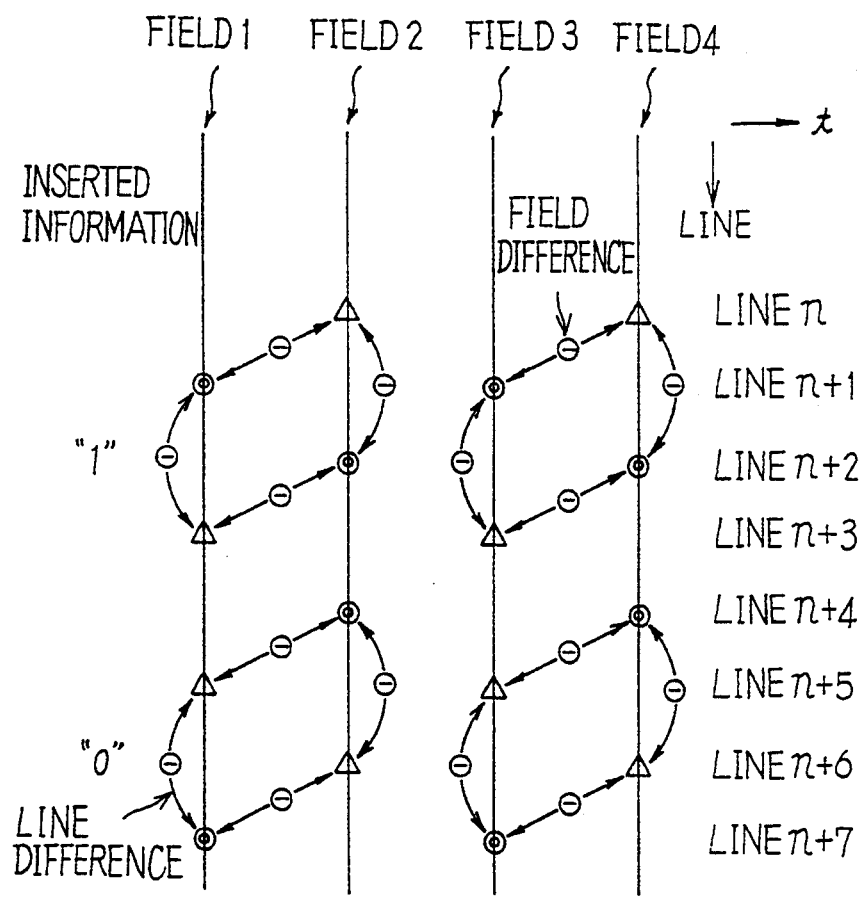
FIG. 13 shows an insertion example of the information signal when the present invention is applied to the PAL system.

The above mentioned embodiment relates to the example that this invention is applied to the NTSC system having 525 scanning lines. However, the present invention can be applied to the PAL or SECAM systems having 625 scanning lines. In this instance, the information can be inserted similarly to the NTSC system. FIG. 13 shows that the non-inverting and inverting information signals are inserted into two adjacent upper and lower lines having a strong correlation.

Figure 14:
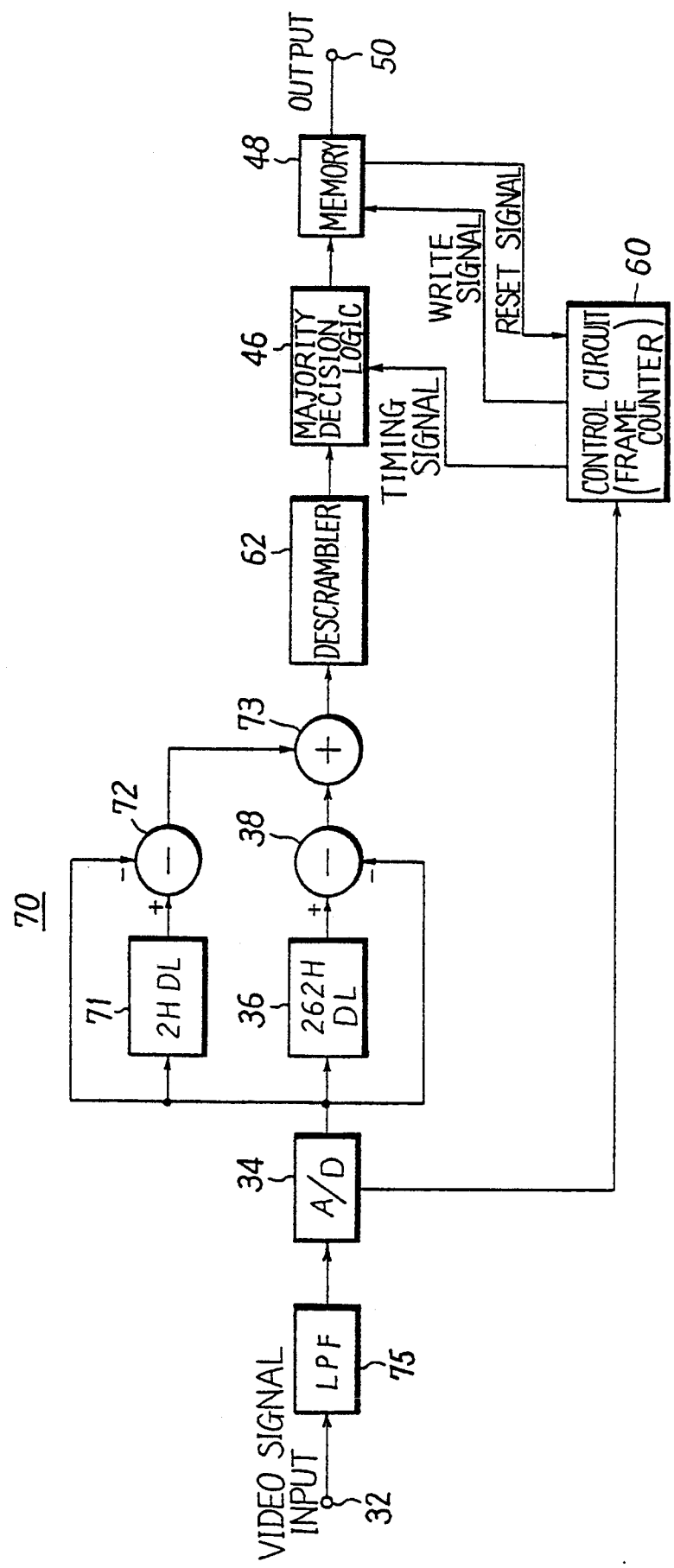
FIG. 14 shows a block diagram of one embodiment of the decoder in the spread spectrum type PAL system that is similar to FIG. 12.

Since a color subcarrier relation of the PAL or SECAM system is different from that of the NTSC system, FIG. 14 shows one example to filtering the subcarrier component with a low pass filter.

In this example, the low pass filter 75 eliminates the color subcarrier component of the video signal. The other processes are the same as the signal processes of the NTSC system shown in FIG. 12. This system can be applied to FIG. 2 or 9.

As being described hereinbefore, the information signal transmission system according to the present invention provides the encoder and decoder for the special information signal inserted into the video signal of the image information. The information signal is inserted into two lines of the same field, over two adjacent fields or the both of them. Moreover, the information signal is inserted into two lines or one of them.

Thus, the level of the information signal inserted into the predetermined period may be low such that the information signal does not interfere or degrade the original video signal for a video period. Since the meaningful unit information is restored by obtaining the difference between two lines, the information signal is difficult to be analyzed and modified.

Since the information signal level to be inserted into the video signal can be changed in accordance with the still image or the moving image as shown in FIG. 1, the detection accuracy of the information signal as decoded may be improved while suppressing interference with the original image.

Therefore, the present invention can provide the information signal transmission system of the high security to maintain the secret of the information relating the contents of the video source without affecting the video source.

While I have shown and described herein the preferred embodiments of my invention, it will be apparent to those skilled in the art that many changes and modifications may be made without departing from my invention in its broader aspects. Therefore, the scope of the present invention should be determined only by the following claims.

I claim:

1. An encoder for inserting special information into a video signal, said encoder comprising:
   a first input for receiving said video signal representative of a predefined video image and having associated alternating field portions of respective interlacing lines and a chrominance modulated color subcarrier;
   means for providing an information modulated signal, the modulation thereof being representative of said special information;
   motion detection means for determining image movement of the video image represented by said video signal; and
   means for inserting the information modulated signal into said video signal in accordance with the image movement determined by the motion detection means wherein the insertion level is set to a higher relative level upon determination of image movement.

2. An encoder according to claim 1 wherein the information modulated signal provided by the providing means has a carrier frequency equal to one-half the frequency of the color subcarrier of said video signal.

3. An encoder according to claim 1 further comprising modulation means receiving a carrier signal of said carrier frequency and an information signal of said special information for providing said information modulated signal by modulating the carrier signal per the information signal.

4. An encoder for inserting special information into a video signal according to claim 3 wherein said modulation means is operative to provide phase shift modulation.

5. An encoder for inserting special information into a video signal according to claim 3 wherein said information signal includes data regarding the source of said video signal.

6. An encoder according to claim 1 wherein the motion detector means includes means for retaining image information of a prior frame of said video signal which is a predetermined number of frames prior a current frame of said video signal, and means for comparing said image information of said prior frame with respective image information of the current frame for providing a motion detection signal in accordance with differences therebetween, the motion detection signal being received by the insertion means for effecting said insertion level.

7. An encoder according to claim 1 wherein the insertion means includes means for designating a primary line of a primary field of said video signal upon which said information modulated signal will be superimposed, means for adjusting the amplitude of said information modulated signal in accordance with the image movement determined by the motion detection means, and means for combining said amplitude adjusted signal with said primary line portion of said video signal.

8. An encoder according to claim 7, wherein the designating means is further operative for designating a secondary line of said video signal with which a polarity inverted replica of said amplitude adjusted signal is to be inserted, and the combining means is further operative for combining said phase inverted amplitude adjusted signal with said secondary line of said video signal.

9. An encoder according to claim 8 wherein said secondary line is of said primary field.

10. An encoder according to claim 8 wherein said secondary line corresponds to a line adjacent said primary line and of a field sequentially adjacent said primary field.

11. An encoder according to claim 8 wherein said secondary line corresponds to a line adjacent said primary line and of a field sequentially separated from said primary field by at least one other field.

12. An encoder according to claim 7 wherein the designating means is further operative for designating a plurality of secondary lines of said video signal with which said amplitude adjusted signal also is inserted, and the combining means is further operative for combining said amplitude adjusted signal with each of the plurality of secondary lines of said video signal.

13. An encoder according to claim 7 wherein the insertion means also includes a limiting means for limiting the amplitude of said video signal before said amplitude adjusted signal is combined therewith.

14. A decoder for extracting special information from an encoded video signal, said decoder comprising:
   an input for receiving said encoded video signal having alternating field portions of respective interlacing lines per a primary modulated carrier of a primary carrier frequency, modulated color subcarrier of a secondary carrier frequency and an information modulated signal of a predetermined carrier frequency between the primary and secondary carrier frequencies, the modulation thereon being representative of said special information;

filtering means for filtering said encoded video signal per a selective frequency bandwidth for selecting the information modulated signal; and demodulator means for extracting said special information by demodulating the selected information modulated signal.

15. A decoder according to claim 14 wherein said predetermined carrier frequency is equal to one-half the frequency of the color subcarrier and said filtering means has a center frequency substantially equal to one-half the frequency of said color subcarrier.

16. A decoder according to claim 14 wherein the modulation of said information modulated signal comprises phase shift modulation and said demodulator means is operative for synchronously detecting the phase shift modulation of the selected information modulated signal.

17. A decoder according to claim 14 wherein said information modulated signal is superimposed with a primary line of said interlacing lines of said encoded video signal, said decoder further comprising means for comparing said primary line with a secondary line of said interlacing lines and providing a first difference signal by taking the difference between the respective line signal portions wherein the modulated color subcarrier components thereof substantially cancel one another leaving primarily said information modulated signal, said difference signal being received by said filtering means as said encoded video signal.

18. A decoder according to claim 17 wherein said comparison means includes means for obtaining said secondary line from adjacent said primary line.

19. A decoder according to claim 17 wherein said comparison means includes means for obtaining said secondary line from said primary field.

20. A decoder according to claim 17 wherein said comparison means includes means for obtaining said secondary line from a secondary field adjacent said primary field.

21. A decoder according to claim 17 wherein said comparison means includes means for obtaining said secondary line from a secondary field sequentially spaced from said primary field by at least one other field.

22. A decoder according to claim 17 wherein said comparison means is further operable for comparing said primary line with another line of said interlacing lines other than said secondary line and providing another difference signal by taking the difference between the respective line signal portions such that the modulated color subcarrier components thereof cancel one another leaving primarily said information modulated signal, and being further operative for summing each difference signal together to provide said difference signal received by said filtering means.

23. A decoder according to claim 22 wherein said comparison means includes means for obtaining said secondary line from lines of said interlacing lines adjacent said primary line.

24. A decoder according to claim 22 wherein said comparison means includes means for obtaining said secondary line and said another line from said primary field.

25. A decoder according to claim 22 wherein said comparison means includes means for obtaining said secondary line from said primary field and said another line from a field sequentially adjacent said primary field.

26. A decoder according to claim 22 wherein said comparison means includes means for obtaining said secondary line from said primary field and said another line from a field sequentially spaced from said primary field by at least one other field.

* * * * *

UNITED STATES PATENT AND TRADEMARK OFFICE
CERTIFICATE OF CORRECTION

PATENT NO. : 5,386,240
DATED : January 31, 1995
INVENTOR(S) : Akihiro Hori It is certified that error appears in the above-identified patent and that said Letters Patent is hereby corrected as shown below:

Column 1, line 7, after "that" insert --is--.

line 13, delete "the" (first occurrence).

line 13, change "informant on" to --information--.

Column 3, line 57, delete "QY" and substitute --Qy--.

Column 6, line 12, after "frequency" and before the comma (,), insert a closing parenthesis ()).

line 23, after "3/1024" and before "levels" insert --of the dynamic range--.

line 24, after "insertion" and before "does" insert --level--.

line 58, delete "or".

Column 7, line 61, change "producing" to --providing--.

Column 8, line 7, delete "shown".

line 23, delete "may".

line 46, change "Sy. With" to --Sy with--.

UNITED STATES PATENT AND TRADEMARK OFFICE
CERTIFICATE OF CORRECTION

PATENT NO. : 5,386,240
DATED      : January 31, 1995
INVENTOR(S): Akihiro Hori

It is certified that error appears in the above-indentified patent and that said Letters Patent is hereby corrected as shown below:

Column 8:
    line 55, after "the" (second occurrence) and before "information" insert --extracted--.

Signed and Sealed this

Twelfth Day of September, 1995

BRUCE LEHMAN

*Attest:*

*Attesting Officer*  *Commissioner of Patents and Trademarks*